United States Patent
Gebhard

(10) Patent No.: US 11,255,265 B2
(45) Date of Patent: Feb. 22, 2022

(54) AIR-OIL SEPARATION SYSTEM FOR GAS TURBINE ENGINE

(71) Applicant: Rolls-Royce Corporation, Indianapolis, IN (US)

(72) Inventor: John R. Gebhard, Fishers, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 345 days.

(21) Appl. No.: 16/291,681

(22) Filed: Mar. 4, 2019

(65) Prior Publication Data

US 2020/0284163 A1 Sep. 10, 2020

(51) Int. Cl.
| | | |
|---|---|---|
| *F02C 7/06* | (2006.01) |
| *B01D 45/14* | (2006.01) |
| *B01D 19/00* | (2006.01) |
| *F01M 13/04* | (2006.01) |

(52) U.S. Cl.
CPC ............... *F02C 7/06* (2013.01); *B01D 45/14* (2013.01); *B01D 19/0057* (2013.01); *F01M 13/04* (2013.01); *F05D 2260/602* (2013.01); *F05D 2260/609* (2013.01)

(58) Field of Classification Search
CPC ... F02C 7/06; F02C 7/32; B01D 45/14; B01D 19/0057; F05D 2260/602; F05D 2260/609; F05D 2260/98; F05D 2250/25; Y02T 50/60; F01D 25/20; F01D 25/18; F16N 39/002; F16N 2210/02; F01M 13/04; F01M 2013/0422
See application file for complete search history.

(56) References Cited

U.S. PATENT DOCUMENTS

| | | |
|---|---|---|
| 4,531,358 A | 7/1985 | Smith |
| 5,776,229 A | 7/1998 | Blanes et al. |
| 6,709,476 B2 | 3/2004 | Kitano et al. |
| 6,877,950 B2 | 4/2005 | Liu |
| 7,566,356 B2 | 7/2009 | Latulipe |
| 7,867,310 B2 | 1/2011 | Baten |
| 8,245,818 B2 | 8/2012 | Alecu |
| 8,443,843 B2 | 5/2013 | Mount et al. |
| 8,601,785 B2 | 12/2013 | Legare |
| 8,602,165 B2 | 12/2013 | Szolomayer et al. |
| 8,997,935 B2 | 4/2015 | Szolomayer et al. |
| 9,097,180 B2 | 8/2015 | Ekanayake et al. |

(Continued)

FOREIGN PATENT DOCUMENTS

| | | |
|---|---|---|
| EP | 3669964 A1 | 6/2020 |
| FR | 3064304 A1 | 9/2018 |

OTHER PUBLICATIONS

Extended European Search Report, European Application No. 20160610.0-1007, dated Jul. 22, 2020, 10 pages.

*Primary Examiner* — Robert Clemente
*Assistant Examiner* — Hafiz Muhammad Aamir
(74) *Attorney, Agent, or Firm* — Barnes & Thornburg LLP

(57) ABSTRACT

An air-oil separation system for a gas turbine engine system comprises a housing that extends circumferentially around an axis to define an interior chamber of the housing and a separation unit located in the chamber. The housing is formed to include an inlet configured to receive a mixture of air and oil, an oil outlet configured to conduct oil to exit the housing, and an air outlet configured to conduct air to exit the housing. The air-oil separation unit separates air from the oil.

17 Claims, 4 Drawing Sheets

(56) References Cited

U.S. PATENT DOCUMENTS

| | | | |
|---|---|---|---|
| 9,732,707 B1* | 8/2017 | Urban | F01M 13/023 |
| 10,060,289 B2 | 8/2018 | Sheridan | |
| 2004/0098956 A1 | 5/2004 | Care et al. | |
| 2005/0211093 A1 | 9/2005 | Latulipe et al. | |
| 2007/0163444 A1* | 7/2007 | Eliasson | B04B 5/12 |
| | | | 96/281 |
| 2009/0235631 A1* | 9/2009 | Bocquet | F02C 7/236 |
| | | | 60/39.08 |
| 2010/0028127 A1 | 2/2010 | Cornet et al. | |
| 2011/0030324 A1* | 2/2011 | Higgins | B01D 45/14 |
| | | | 55/400 |
| 2013/0091860 A1 | 4/2013 | Foster | |
| 2016/0208650 A1 | 7/2016 | Craig et al. | |
| 2018/0119617 A1 | 5/2018 | Pulter et al. | |

* cited by examiner

AIR-OIL SEPARATION SYSTEM FOR GAS TURBINE ENGINE

FIELD OF THE DISCLOSURE

The present disclosure relates generally to gas turbine engines and more specifically to an air-oil separation system for use in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

During this process, lubrication may be provided to a plurality of bearings supporting a rotor of the gas turbine engine to maintain smooth operation of the engine. Such bearings may be contained within bearing chambers and the lubricant (i.e.: oil) is positioned therein. After use, the oil may flow to the bottom of the bearing chamber from where it is scavenged by a pump and returned to an oil tank. The scavenged oil may be aerated during the lubrication process by the air within the bearing chambers. Prior to re-use of the lubrication oil in the engine, the oil may first be separated from the air combined with the oil during the lubrication and scavenging process.

In some examples, a two-step process is used to separate the air from the oil. The first step includes guiding the air and oil mixture through an air and oil separator coupled to the main oil tank followed by a second step which utilizes a breather coupled to the gearbox. The breather is configured to separate the remaining oil from the air before exhausting the air out of the engine and guiding the residual oil into the gearbox in which it is held.

SUMMARY

The present disclosure may comprise one or more of the following features and combinations thereof.

An air-oil separation system for a gas turbine engine may include a housing, an air-separation shaft, and an oil-separation system. The housing may be formed to define and interior chamber of the housing and include an inlet, an oil outlet, and an air outlet. The air-separation shaft may located in the housing and configured to rotate about an axis. The air-separation shaft may be formed to include an air passage and a plurality of holes. The air passage may be in fluid communication with the air outlet so that air located in the interior chamber is separated from oil and conducted through the plurality of air holes into the air passage and out of the air outlet. The oil-separation system may be rotatably coupled with the air-separation shaft for rotation about the axis relative to the housing. The oil-separation rotor may be formed to include a plurality of oil holes that extend radially through the oil-separation rotor to cause oil located in the interior chamber to be separated from air and conducted radially outward through the plurality of oil holes toward the housing and out of the oil outlet.

In some embodiments, the air-oil separation system may comprise a conduit fluidly coupled with the air outlet and configured to direct air received by the air outlet from the air-separation shaft toward the impeller.

According to another aspect of the present disclosure, the oil-separation rotor may include an inner band arranged circumferentially about the axis, an outer band arranged circumferentially about the inner band, and a metallic foam material located radially between the inner band and the outer band.

In some embodiments, the oil-separation rotor may include a spiral guide rail coupled to the inner band to locate the inner band radially between the spiral guide rail and the metallic foam material.

According to another aspect of the present disclosure, the air-separation shaft may include a cylindrical body and a metallic foam material located radially within the body in the air passage.

In some embodiments, the air-oil separation system may comprise a rotation drive coupled with the air-separation shaft and configured to rotate the air-separation shaft about the axis.

According to another aspect of the present disclosure, an air-oil separation system for a gas turbine engine may include a housing, a separation unit, and a rotation drive. The housing may be formed to define an interior chamber and formed to include an inlet, an oil outlet, and an air outlet. The separation unit may be located in the interior chamber and configured to receive a mixture of air and oil from the inlet and to rotate about the axis to separate the air from the oil and direct the air toward the air outlet and to direct the oil toward the oil outlet. The rotation drive may be configured to rotate the separation unit about the axis.

In some embodiments, the separation unit may include an air-separation shaft configured to rotate about the axis and an oil-separation rotor coupled with the air-separation shaft for rotation therewith.

According to another aspect of the present disclosure, the air-oil separation system may be formed to include an air passage that extends axially through the air-separation shaft and a plurality of air holes that extend radially through the air-separation shaft and open into the air passage and the air passage is in fluid communication with the air outlet.

In some embodiments, the oil-separation rotor may include a first band arranged circumferentially about the axis and the first band is formed to include a plurality of holes that extend radially through the first band.

According to another aspect of the present disclosure, the oil-separation rotor may include a spiral guide rail coupled to the first band and extends radially inwardly away from the first band and toward the axis.

In some embodiments, the oil-separation rotor may include a second band arranged circumferentially about the first band and a metallic foam material located radially between the first band and the second band.

According to another aspect of the present disclosure, the drive may include a bladed rotor rotatably coupled with the separation unit.

In some embodiments, air-oil separation system may comprise a conduit fluidly coupled with the air outlet and configured to direct air received by the air outlet from the separation unit toward the bladed rotor.

According to another aspect of the present disclosure, the drive may include an electric motor.

In some embodiments, the rotation drive may include a pressurized fluid source configured to supply pressurized fluid to the bladed rotor.

According to another aspect of the present disclosure, method may comprise providing a housing formed to define an interior region therein and a separation unit located in the interior region of the housing, rotating the separation unit about an axis relative to the housing, and supplying a mixture of air and oil to the interior region of the housing to cause the mixture of air and oil to interact with the rotating separation unit to separate the air from the oil.

In some embodiments, the separation unit may include an air-separation shaft configured to rotate about the axis and an oil-separation rotor coupled with the air-separation shaft for rotation therewith. The air-separation shaft may be formed to include an air passage that extends axially through the air-separation shaft and a plurality of air holes that extend radially through the air-separation shaft and open into the air passage. The oil-separation rotor may include a band arranged circumferentially about the axis. The band may be formed to include a plurality of holes that extend radially through the band.

These and other features of the present disclosure will become more apparent from the following description of the illustrative embodiments.

DETAILED DESCRIPTION OF THE DRAWINGS

Figure 1:
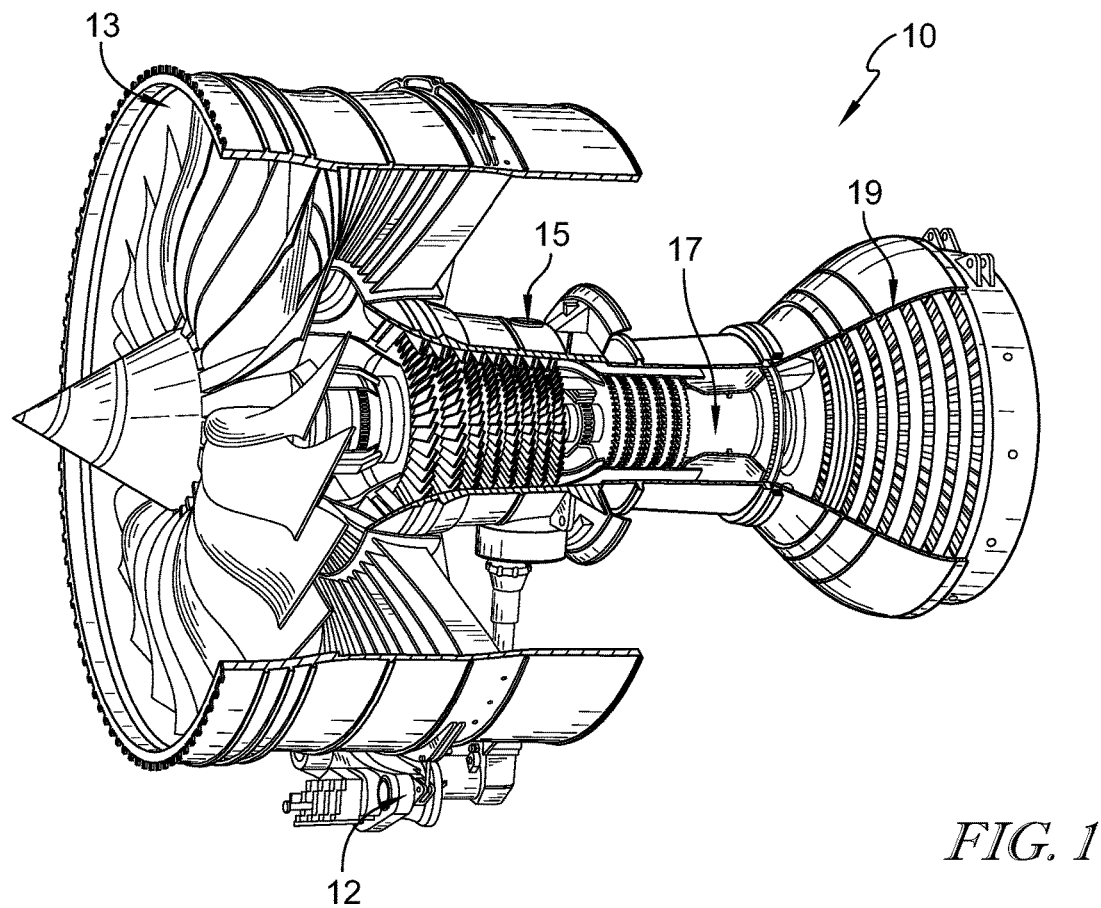
FIG. 1 is a cutaway view of a gas turbine engine that includes a fan, a compressor, a combustor, a turbine, and is configured to cooperate with an air-oil separation system in accordance with the present disclosure that is adapted to receive an air and oil mixture scavenged from an engine sump and a plurality of bearings and/or a shaft supported thereon in the gas turbine engine during operation and to separate the scavenged air and oil mixture into a flow of air and a flow of oil.
Figure 2:
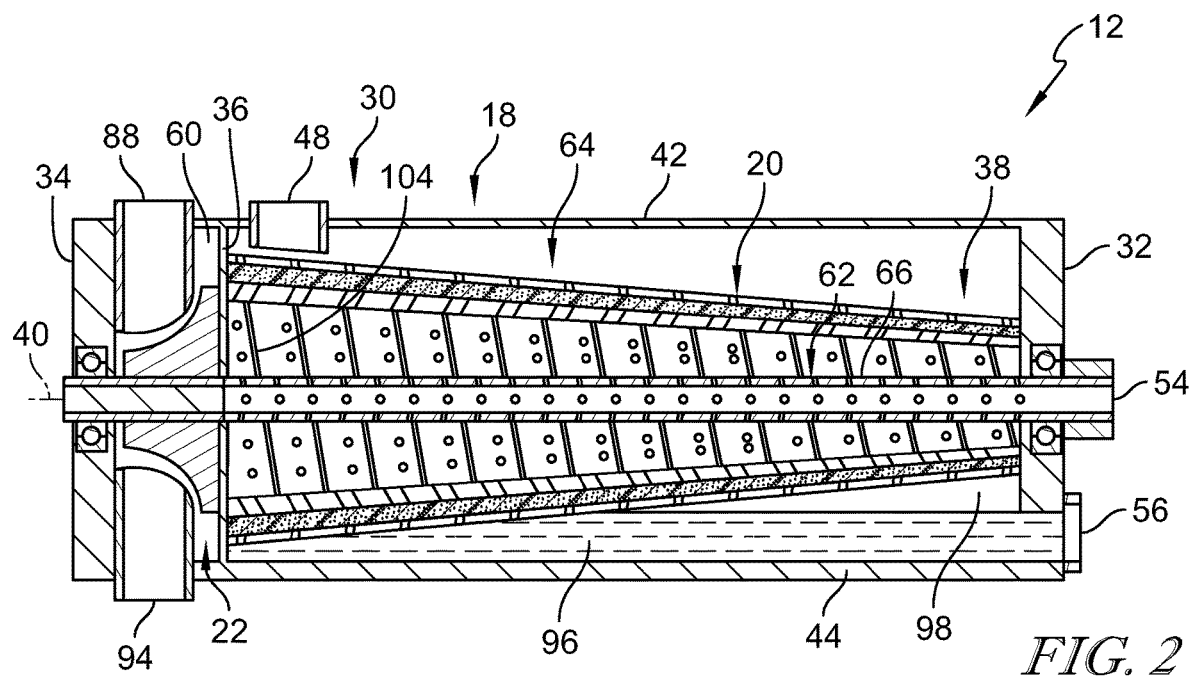
FIG. 2 is a diagrammatic cross-sectional view of the air-oil separation system for use in the gas turbine engine of FIG. 1 showing a housing having an outer wall formed to define an inlet for the scavenged air and oil mixture, a separation unit configured to separate the air from the oil mixture, and a rotation drive coupled to the separation unit and configured to rotate the separation unit to separate the air and oil mixture.

For the purposes of promoting an understanding of the principles of the disclosure, reference will now be made to a number of illustrative embodiments illustrated in the drawings and specific language will be used to describe the same.

An air-oil separation system 12 in accordance with the present disclosure is adapted for use in a gas turbine engine 10 as shown and suggested in FIGS. 1-6. The gas turbine engine 10 includes a fan 13, a compressor 15, a combustor 17, and a turbine 19 as shown in FIG. 1. The fan 13 generates thrust for propelling an aircraft. The compressor 15 compresses and delivers air to the combustor 17. The combustor 17 mixes fuel with the compressed air received from the compressor 15 and ignites the fuel. The hot, high-pressure gases from the burning fuel are directed into the turbine 19 where the turbine 19 extracts work from the gases to drive the compressor 15 and the fan 13. In other embodiments, the gas turbine engine 10 may include a shaft, turboprop, or gearbox in place of the fan 13.

The air-oil separation system 12 is positioned within the gas turbine engine 10, as shown in FIG. 1, and may be coupled fluidly to an oil tank 16 located within the engine 10. The air-oil separation system 12 is configured to separate an air and oil mixture 14 such that the air and oil exit the air-oil separation system 12 distinct from each other. Illustratively, the air exits the system 12 as an exhausted air flow 26 and the oil exits the system 12 as a collected oil flow 28. The exhausted air flow 26 may be used to propel a device coupled to the gas turbine engine 10 and/or the system 12 itself. The collected oil flow 28 may be returned to an oil tank 16 for re-use in the engine 10.

Figure 3:
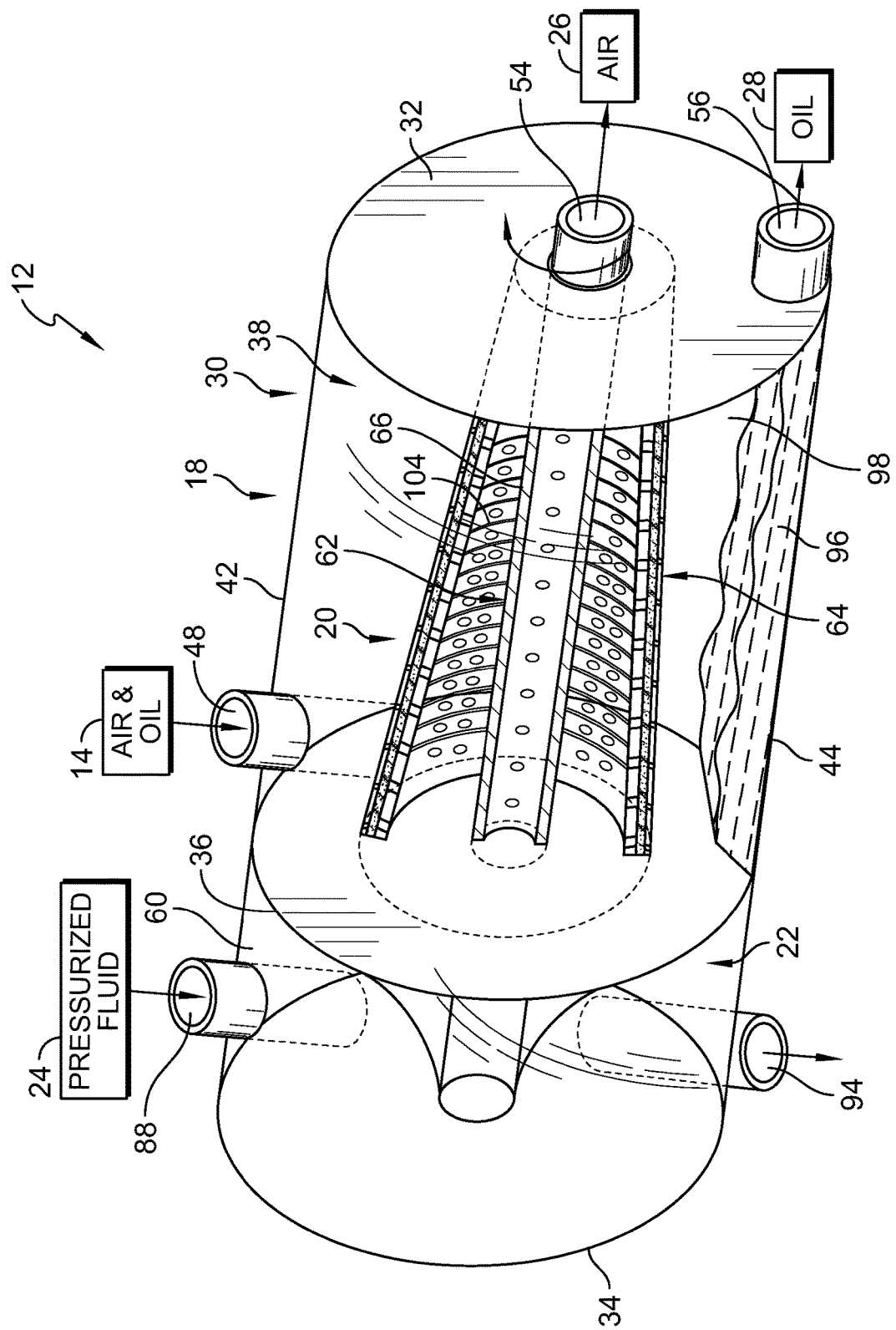
FIG. 3 is a diagrammatic perspective view of the air-oil separation system of FIG. 2 with portions broken away showing the air and oil mixture entering the inlet formed in the housing, the exhausted air exiting an air outlet formed in the housing, the separated oil exiting an oil outlet formed in the housing, a pressurized fluid entering a pressure inlet formed in the housing, and a pressurized fluid exiting a pressure outlet formed in the housing, the pressure inlet and the pressure outlet configured to guide the pressurized fluid towards an impellor for rotation thereof.
Figure 5:
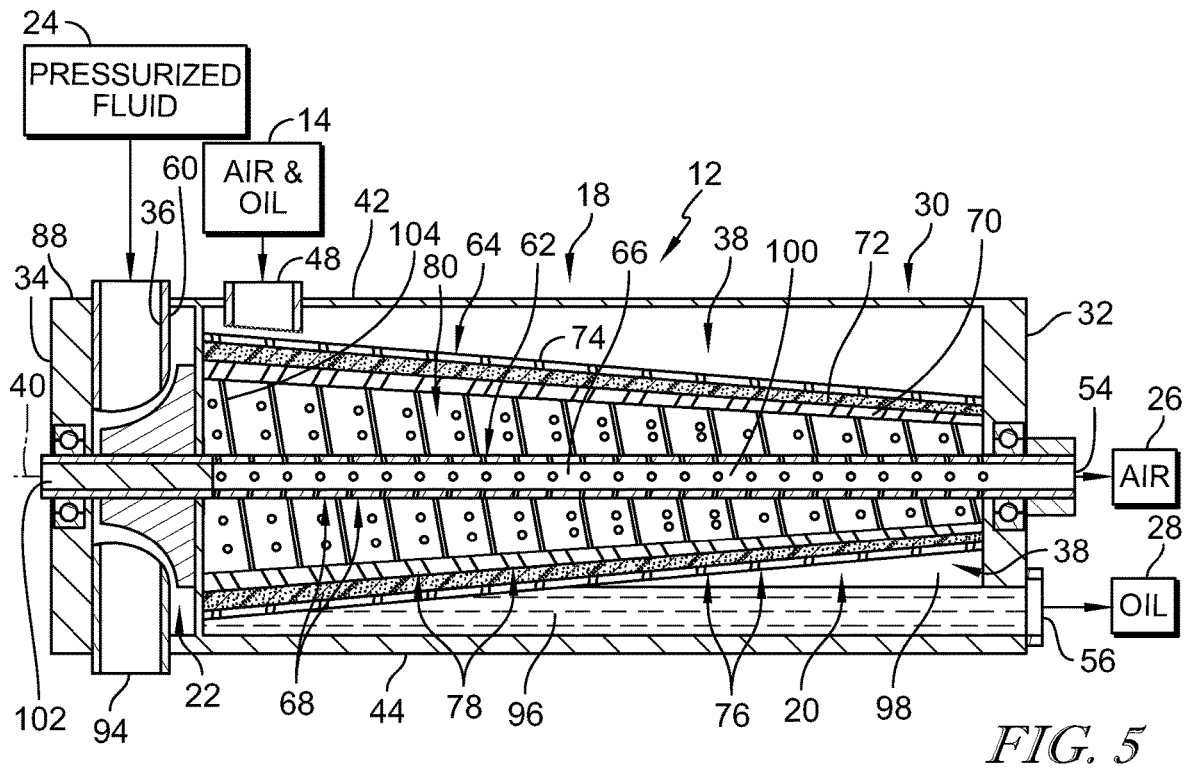
FIG. 5 is a diagrammatic cross-sectional view of the air-oil separation system of FIG. 2.
Figure 6:
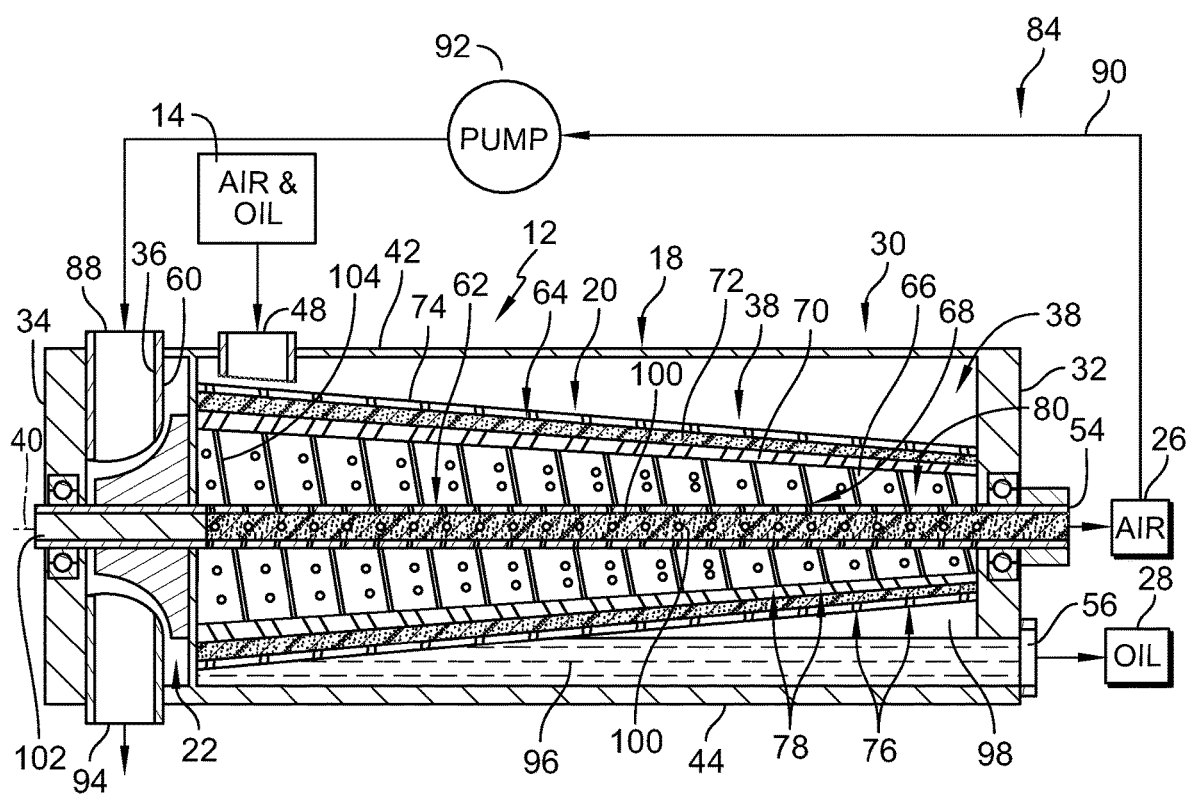
FIG. 6 is a diagrammatic cross-sectional view of the air-oil separation system adapted for use in the gas turbine engine of FIG. 1 showing the separation unit further including a metal form core formed therein and a pressurized fluid source configured to direct exhausted air from the air outlet of the housing towards an air pump configured to increase the pressure of the exhausted air and guide the pressurized, exhausted air towards a pressure inlet formed in the housing to drive an impellor in communication with the air-oil separation system.

The air-oil separation system 12 includes a housing 18, a separation unit 20, and a rotation drive 22 as shown in FIGS. 2, 3, 5, and 6. The housing 18 is configured to contain the separation unit 20 and the rotation drive 22 therein. The separation unit 20 is positioned within the housing 18 and is configured to receive the air and oil mixture 14 as shown in FIGS. 3, 5, and 6. The rotation drive 22 is configured to rotate the separation unit 20 using a source of pressurized fluid 24 as suggested in FIGS. 3, 5, and 6. As such, the separation unit 20 and the rotation drive 22 cooperate to separate the oil from the air of the air and oil mixture 14 and direct each out of the air-oil separation system 12 independent of the other. Illustratively, the exhausted air flow 26 contains little to no remnants of oil from the air and oil mixture 14, and the collected oil flow 28 contains little to no air from the air and oil mixture 14.

The housing 18 includes an outer wall 30, a first end wall 32, a second end wall 34, and a divider plate 36 as shown in FIGS. 2, 3, 5, and 6. The outer wall 30 extends circumferentially around the separation unit 20 and the rotation drive 22 and cooperates with the first end wall 32 and the second end wall 34 to define an interior region 38 therein. The first end wall 32 extends perpendicularly to an axis 40 and couples to the outer wall 30. The second end wall 34 extends perpendicular to the axis 40 and couples to the outer wall 30. The first wall 32 is radially spaced apart from the second wall 34 and both walls 32, 34 cooperate with the outer wall 30 to define the interior region 38.

Figure 4:
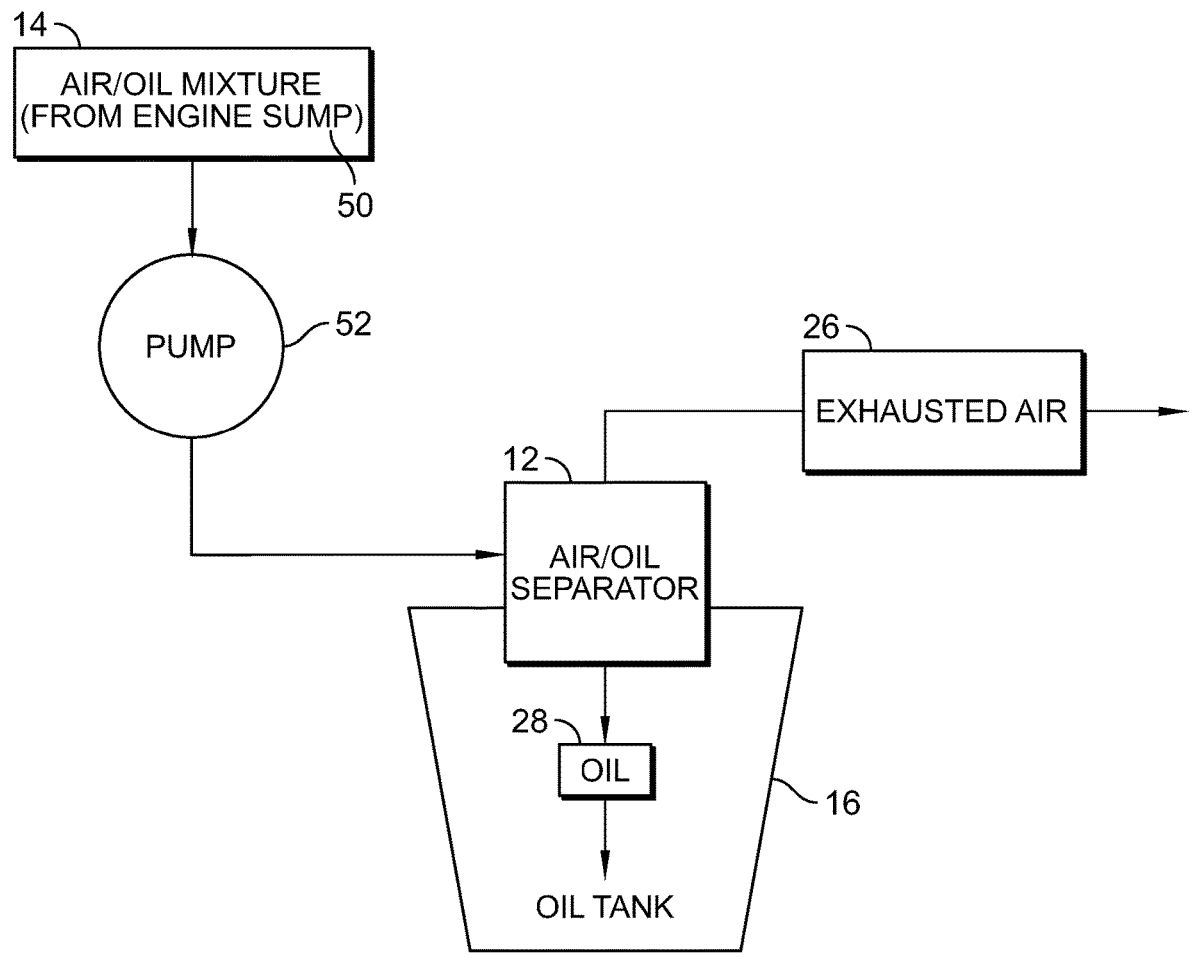
FIG. 4 is a diagrammatic view of the process by which the air-oil separation system of FIG. 2 separates the air and oil mixture, the process includes a pump configured to draw the air and oil mixture away from the engine sump and into the air-oil separation system coupled with an oil tank, the air-oil separation system is configured to separate the air and oil mixture and direct the oil into the oil tank and the air out of the separation unit so that it may be exhausted to atmosphere.

The outer wall 30 is formed to include an upper portion 42 and a lower portion 44 as shown in FIGS. 2, 3, 5, and 6. The upper portion 42 extends axially between the first end wall 32 and the second end wall 34 and is formed to include an inlet 48 configured to receive the air and oil mixture 14, illustratively. The lower portion 44 extends axially between the first end wall 32 and the second end wall 34. The inlet 48 extends radially away from the upper portion 42 of the outer wall 30. The inlet 48 is formed to receive the air and oil mixture 14 collected in an engine sump 50 and guide the air and oil mixture 14 into the interior region 38 of the air-oil separation system 12, as shown in FIG. 4. Illustratively, the air and oil mixture 14 flows from the engine sump 50 to a pump 52 configured to direct the air and oil mixture 14 into the air-oil separation system 12 through the inlet 48.

The first end wall 32 is formed to include an air outlet 54 and an oil outlet 56 as shown in FIGS. 2, 3, 5, and 6. The air outlet 54 axially extends from the first end wall 32 and is aligned along the axis 40. The oil outlet 56 axially extends from the first end wall 32 and is radially spaced apart from the air outlet 54 relative to the axis 40.

The air outlet 54 is configured to guide the stream of exhausted air flow 26 out of the interior region 38 following separation of the air and oil mixture 14, as shown in FIGS. 3, 5, and 6. The exhausted air flow 26 is, illustratively, sucked from the air-oil separation system 12 and may be used for beneficial energy capture to propel a device requiring rotation to function, as suggested in FIG. 5. In some embodiments, the air is exhausted to ambient environment surrounding the system 12.

The oil outlet 56 is configured to guide the collected oil flow 58 out of the interior region 38 following separation of the air and oil mixture 14 as shown in FIGS. 3, 5, and 6. Illustratively, prior to exiting the air-oil separation system 12, any gaseous oil in the collected oil flow 58 is congealed into a liquid state from the gaseous state. The collected oil flow 58 may be guided out of the air-oil separation system 12 into an oil tank 16.

The divider plate 36 is located between the first end wall 32 and the second wall 34 and cooperates with the second end wall 34 to form a drive chamber 60, as shown in FIGS. 2, 3, 5, and 6. The drive chamber 60 is configured to receive a pressurized fluid 24 and guide the pressurized fluid 24 through the chamber 60.

The separation unit 20 includes an air-separation shaft 62 and an oil-separation rotor 64 as shown in FIGS. 2, 3, 5, and 6. The air-separation shaft 62 extends along the axis 40 between the first wall 32 and the second end wall 34. The air-separation shaft 62 is configured to receive residual air from the air and oil mixture 14, form the exhausted air flow 26, and guide the exhausted air 26 out from the interior region 38 through the air outlet 54 formed in the first end wall 32. The air-separation shaft 62 is configured to rotate about the axis 40. The oil-separation rotor 64 extends between the divider plate 36 and the first wall 32. The oil-separation rotor 64 is formed to receive the air and oil mixture 14 through the inlet 48 formed in the outer wall 30 of the housing 18. Illustratively, the oil-separation rotor 64 is coupled to the air-separation shaft 62 and is configured to rotate therewith about the axis 40.

The air-separation shaft 62 includes a body 66 defining an air passage therein as shown in FIGS. 2, 3, 5, and 6. The body 66 extends along the axis 40 between the first wall 32 and the second end wall 34 and is further formed to include a plurality of holes 68 therein. The plurality of holes 68 extend radially through the body 66 and axially along the body 66 of the air-separation shaft 62. In some embodiments, the plurality of holes 68 may be formed as clusters spaced apart from each other or any other formation known in the art. Illustratively, the plurality of holes 68 are sized to allow air-sized molecules to enter the body 66 of the air-separation shaft 62 and to block the oil of the air and oil mixture 14 from entering the body 66. As such, only or substantially only air from the air and oil mixture 14 enters the body 66 of the shaft 62 to be guided therethrough to the air outlet 54 formed in the first end wall 32. Illustratively, the air-separation shaft 62 rotates about the axis 40 upon actuation of the air-oil separation system 12.

The oil-separation rotor 64 includes an outer band 74, a metal foam core 72, and an inner band 70. The outer band 74 is coupled to the metal foam core 72 and extends between the first wall and the second wall 34. The metal foam core 72 is positioned radially between the inner band 70 and the outer band 74 and extends between the first wall 32 and the second wall 34. The inner band 70 extends between the first wall 32 and the second wall 34. Collectively, the outer band 74, the metal foam core 72, and the inner band 70 cooperate to receive the air and oil mixture 14. The outer band 74, the metal foam core 72, and the inner band 70 further cooperate with the air-separation shaft 62 to separate the air and oil of the air and oil mixture 14.

The outer band 74 is formed to include a plurality of apertures 76 that extend radially therethrough and is configured to receive the air and oil mixture 14 through the inlet 48 formed in outer wall 30 as shown in FIGS. 2, 3, 5, and 6. Illustratively, the outer band 74 is formed from a metallic material. Further, the plurality of apertures 76 are sized to allow the air and oil mixture 14 the separation unit 20. As such, the outer band 74 rotates with the air-oil separation system 12 upon actuation and is further configured to guide the air and oil mixture 14 between the inlet 48 and the metal foam core 72.

The metal foam core 72 is configured to receive the air and oil mixture 14 from the outer band 74. The metal foam core 72 is configured to act as a filter and permit air from the mixture 14 to pass through to the inner band 70. The metal foam core 72 may be formed from any style foam metal. For example, the metal foam core 72 may be formed from, but is not limited to, RETIMET®. The metal foam core 72 is configured to filter out some or all of the oil from the air and oil mixture 14. Illustratively, the metal foam core 72 is sized to allow air to pass freely through. Yet, oil may remain in the air and oil mixture 14. To further separate the remaining air and oil mixture 14, the remaining oil and air mixture 14 is guided to the inner band 70 after passing through the metal foam core 72.

The inner band 70 is formed to include a plurality of apertures 78 that extend radially therethrough. The inner band 70 is configured to receive the remaining air and oil mixture 14 from the metal foam core 72. Further, the plurality of apertures 78 are sized to allow the remaining air and oil mixture 14 to enter an inner zone 80 of the separation unit 20. As such, the inner band 70 rotates upon actuation of the air-oil separation system 12. Illustratively, the outer band 74, the metal foam core 72, and the inner band 70 forming the oil-separation rotor 64 rotate together about the axis 40. As such, the air and oil mixture 14 rotates about the axis 40 and the air-separation shaft 62 upon entering the inner zone 80 of the separation unit 20.

The rotation drive 22 includes at least one of an impeller and/or an electric motor (not shown) and a pressurized fluid source 84 in communication with the impeller as suggested in FIGS. 5 and 6. The rotation drive 22 is configured to provide rotational energy to the air-oil separation system 12. The rotation drive 22 is coupled to the air-separation shaft 62 at the second end wall 34 and configured to rotate therewith upon actuation of the system 12. The pressurized fluid source 84 is in communication with the impeller and configured to provide rotational energy thereto to rotate the air-separation shaft 62 coupled to the impeller. The impeller and the pressurized fluid source 84 cooperate to achieve rotation of the separation unit 20 about the axis 40.

The pressurized fluid source 84 is configured to provide a pressurized fluid 24 and direct the fluid 24 towards a pressurized fluid inlet 88 positioned between the first end wall 32 and the divider plate 36 and formed in the upper portion 42 of the outer wall 30, as suggested in FIGS. 5 and 6. Illustratively, the pressurized fluid source 84 is the air-oil separation system 12 as shown in FIG. 6. In some embodiments, the pressurized fluid source 84 is the compressor 15 configured to provide pressurized bleed air therefrom. In other embodiments, the pressurized fluid source 84 is an oil tank/oil source 16 configured to provide pressurized oil.

In the illustrative embodiment, air is separated from the air and oil mixture 14 and guided through the air-separation shaft 62 until exiting the system 12 at an air outlet 54 formed in the first end wall 32 of the housing 18. A conduit 90 and a pump 92 are further included in the pressurized fluid source 84, and the conduit 90 is coupled to the air outlet 54 to guide the air from the air outlet 54 to the pressurized fluid inlet 88. The conduit 90 is formed to extend between and couple to the air outlet 54 and the pressurized fluid inlet 88 and direct the exhausted air flow 26 towards the pump 92 coupled thereto. The pump 92 is positioned such that the conduit 90 extends between the air outlet 54 and the pump 92 to provide the exhausted air flow 26 to the pump 92.

The pump 92 is configured to increase the pressure of the exhausted air flow 26 such that the air is pressurized and pump the pressurized air 24 towards the pressurized fluid inlet 88. The conduit 90 is further formed to extend between and couple to the pump 92 and the pressurized fluid inlet 88 and direct the pressurized air 24 towards the inlet 88. As the pressurized air 24 passes through the inlet 88, it enters the drive chamber 60 and is guided therethrough to a pressurized fluid outlet 94 located between the first end wall 32 and the divider plate 36 and formed in the lower portion 44 of the outer wall 30.

Upon passing through the drive chamber 60, the pressurized air 24 interacts with the air-separation shaft 62 coupled to the impeller positioned therein. The impeller is formed to rotate about the axis 40 in response to the pressurized air 24, thereby rotating the air-separation shaft 62 therewith. Illustratively, the impeller and the pressurized air 24 cooperate to generate rotation of the separation unit 20 and initiate the separation of the air-oil mixture 14 therein.

To begin the separation process, pressurized fluid 24 is guided into the drive chamber 60, as discussed above, and rotates the impeller located therein and coupled to the air-separation shaft 62 as shown in FIGS. 5 and 6. As discussed above, the air-separation shaft 62 extends between the second end wall 34 and the first end wall 32 and is coupled to the oil-separation rotor 64 for rotation therewith. As such, upon rotation of the impeller about the axis 40, the air-separation shaft 62 and oil-separation rotor 64 rotate about the axis 40. Such components 62, 64 cooperate to receive and separate the air and oil mixture 14 guided therein following actuation of the system 12.

Upon initiation of rotation, the scavenged air and oil mixture 14 is directed into the interior region 38 of the housing 18 through the inlet 48 from the bearing chambers (not shown). The inlet 48 guides the air and oil mixture 14 towards the outer band 74 and through the plurality of apertures 76 formed therein. The apertures 76 are sized to allow both oil and air to pass through the outer band 74.

The metal foam core 72 is configured to act as an additional filtration system and separates air-sized molecules and oil-sized molecules as the oil and air mixture 14 passes therethrough. Illustratively, the composition of the metal foam core 72 is configured to trap oil-sized molecules while allowing air-sized molecules to pass through. After passing through the metal foam core 72 the remaining mixture 14 may still include a combination of air and oil. The inner band 70 is configured to provide additional separation of the air and oil.

As mentioned above, the inner band 70 is formed to include a plurality of apertures 78 sized to allow oil from the remaining mixture 14 to pass through and permeate the surface of the inner band 70. Such separation is accomplished by the rotation of the inner band 70 about the axis 40 and the difference in density between air-molecules and oil-molecules. Since oil-molecules have a greater density, they will be guided to the surface of the inner band 70 due to the rotation of the separation unit 20, and thereby, provide an additional level of filtration.

Upon separation from the oil molecules, air molecules from the mixture 14 may remain in the interior region 38. The hollow air-separation shaft 62 is configured to remove the remaining air molecules through air-sized molecule holes 68 formed therein. The air molecules are guided through the shaft 62 towards the air outlet 54 due to a vacuum mechanism in communication with the shaft 62. The air molecules are then expelled from the separation unit 20 through the air outlet 54.

The remaining oil 96 is collected in an oil collection section 98 located within the housing 18. While in the oil collection section 98, the oil may re-congeal into a liquid state from the gaseous state. Illustratively, the oil collection section 98 is in defined by with the lower portion 44 of the outer wall 30, the divider plate 36, the first wall 32, and the oil outlet 56. The re-congealed oil 96 may be guided through the oil outlet 56 to the oil tank 16 and stored therein.

In some embodiments, the oil outlet 56 may be expanded in size and/or reproduced such that there are multiple oil outlets 56. An increase in the size and/or number of oil outlet(s) 56 may increase the capacity of oil the air-oil separator 12 may receive from the bearing chambers.

In some embodiments, the air-separation shaft 62 further includes a metal foam core 100 positioned within the body 66 as shown in FIG. 6. The metal foam core 100 is configured to act as an additional filter and permit air from the mixture 14 to pass through to the air outlet 54. The metal foam core 100 may be formed from any style foam metal. For example, the metal foam core 100 may be formed from, but is not limited to, RETIMET®. As such, the metal foam core 100 may be sized to filter out oil remnants from the air located in the air-separation shaft 62. The metal foam core 100 discourages oil from entering the shaft 62 and exiting from the air outlet 54. Illustratively, the foam structure of the metal foam core 100 of the shaft 62 is sized such that oil molecules are blocked from passing through the core 100 but air molecules are free to move therein. The shaft 62 cooperates with the metal foam core 100 to trap air molecules within the shaft while allowing any oil molecules that enter the shaft 62 to pass through.

In other embodiments, the air-separation shaft 62 further includes a plug 102 as shown in FIGS. 5 and 6. The plug 102 is located within the shaft 62 and extends between and slightly beyond the second end wall 34 and the divider plate 36. The plug 102 is sized such that it blocks the air and oil mixture 14 from moving between the interior region 38 and the drive chamber 60 and guides the fluid within the shaft 62 towards the oil outlet 56.

In further embodiments, the air-separation shaft includes the metal foam core 100 and the plug 102 as shown in FIG. 6. The plug 102 and the metal foam core 100 cooperate such that only air molecules exit the shaft 62 at the air outlet 54.

In additional embodiments, the oil-separation rotor 64 further includes a spiral guide rail 104 as shown in FIGS. 2, 3, 5, and 6. The spiral guide rail 104 is coupled to the inner band 70 and configured to guide the oil molecules of the air and oil mixture 14 into the plurality of apertures 78 formed within the inner band 70. Due to the rotation of the air-oil separator 12, the air and oil mixture 14 is separated based on density such that the oil (having a higher density) is forced outwardly towards the inner band 70 and interacts with the guide rail 104. The guide rail 104 is shaped to direct the oil towards the inner band 70 and cooperate with the plurality of apertures 78 to allow oil to permeate the surface of the inner band 70 and collect in the oil collection section 98 prior to expulsion from the housing 18 of the air-oil separation system 12. The guide rail 104 extends radially inward toward the axis 40 from the inner band 70. In some embodiments, an electric motor is coupled to the air-separation shaft 62 and located outside of the chamber 60 such that the impeller, and the pressurized air 24 may be omitted.

The air-oil separator 12 of the present application may be sufficiently efficient to use on a gas turbine engine 10 without using an engine breather system (not shown). The air-oil separator 12 of the present disclosure may provide cost reductions for the gas turbine engine 10 and reduce the total engine set value. The air-oil separator 12 is configured to remove the air from the air and oil mixture 14 and the oil from the remaining air and oil mixture 14. The air-oil separator 12 is configured to generate rotational motion about the axis 40 from the incoming air and oil mixture 14 originating from/collected in the bearing chambers. In doing so, the air-oil separator 12 is configured to generate the correct amount of centrifugal forces to extract the less dense air from the more dense oil of the air and oil mixture 14. The air-oil separator 12 may also decrease the overall weight of the gas turbine engine 10.

The gas turbine engine 10 having the air-oil separator 12 of the present application may be configured to eliminate excessive intake of air into the bearing chambers. A carbon seal style sealing mechanism (not shown) may be implemented with an un-vented bearing chamber such that the amount of air drawn across the seal(s) to maintain leak-free operation may be reduced. This may reduce the air draw into the bearing chamber such that the amount of air to be removed from the air and gas mixture 14 is lessened.

To extract the air from the air and gas mixture 14, a multi-stage separation within a single unit, such as the air-oil separator 12, may be used. The air-oil separator 12 may be positioned within/coupled to the oil tank 16 and/or in-line with at least one scavenge oil line (not shown). The air-oil separator 12 may contain a semi-dense, metal foam material that is configured to eliminate the dense/heavy oil molecules from the less dense/lighter air molecules of the air and oil mixture 14. The air-oil separator 12 may contain metal foam material that is configured to generate a cyclonic motion to extract the oil from the oil and air mixture 14. The air-oil separator 12 may be coupled to an upper section of the oil tank 16 or utilized as a stand-alone device within the gas turbine engine 10.

The air-oil separator 12 may generate a high speed rotation to propel the separation unit 20 positioned therein by receiving pressurized oil 24 from the main oil pump (not shown). The separation unit 20 may be formed to receive the air and oil mixture/aerated scavenge oil 14 from the bearing chambers and guide it into the inner zone 80 of the separation unit 20 wherein the air-separation shaft 62 is located. Further, the separation unit 20 may be shaped as a cone.

Upon entering the inner zone 80, the air and oil mixture 14 may rotate about the shaft 62 of the air-oil separator 12 and contact the spiral guide rail 104 of the inner band 70. The inner band 70 may be further formed to include a plurality of diffusion holes 78 sized such that oil from the air and oil mixture 14 may permeate the surface of the inner band 70. The air-oil separator 12 may then guide the oil through the outer band 74 formed from metal foam and into the oil collection section 98 until guided back to the oil tank 16 through the oil outlet 56. The remaining air from the air and oil mixture 14 may stay within inner zone 80. To remove the remaining air, the shaft 62 may be formed to have perforated holes 68 sized to allow only air-sized particles to enter the interior region 38 of the shaft 62. Further, suction may be used to remove the air from within the interior region 38 of the shaft 62 through the air outlet 54. The air from the air outlet 54 may be used for beneficial energy capture to propel any device that may use rotation to function. The air may also be pressurized after exiting the shaft 62 and then guided into the pressurized fluid inlet 48 to assist in propulsion of the gas turbine engine 10 and/or a device coupled thereto.

In some embodiments, the shaft 62 may include a body 66 formed from foam metal to discourage any oil that happened to enter the shaft 62 from exiting the shaft 62 through the air outlet 54. In other embodiments, the oil outlet 56 may be expanded in size and/or the air-oil separator 12 may be formed to include a plurality of oil outlets 56. Increasing the size and/or number of the oil outlet(s) 56 may increase the capacity of oil the air-oil separator 12 receives from the bearing chambers. The air-oil separator 12 may reduce production cost, reduce the weight of the gas turbine engine 10, and decrease the environmental effects of the engine 10.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. An air-oil separation system for a gas turbine engine, the air-oil separation system comprising
   a housing that extends circumferentially around an axis to define an interior chamber of the housing, the housing formed to include an inlet configured to receive a mixture of air and oil, an oil outlet configured to conduct oil substantially free of air to exit the housing, and an air outlet configured to conduct air substantially free of oil to exit the housing,
   an air-separation shaft located in the interior chamber of the housing and configured to rotate about the axis relative to the housing during use of the air-oil separation system, the air-separation shaft formed to include an air passage that extends axially through the air-separation shaft and a plurality of air holes that extend radially through the air-separation shaft and open into the air passage, and the air passage being in fluid communication with the air outlet so that air located in the interior chamber is separated from oil and conducted through the plurality of air holes into the air passage and out of the air outlet during operation of the air-oil separation system, and an oil-separation rotor located in the interior chamber of the housing and arranged circumferentially around the air-separation shaft, the oil-separation rotor being rotatably coupled with the air-separation shaft for rotation about the axis relative to the housing during use of the air-oil separation system, the oil-separation rotor formed to include a plurality of oil holes that extend radially through the oil-separation rotor to cause oil located in the interior chamber to be separated from air and conducted radially outward through the plurality of oil holes toward the housing and out of the oil outlet during operation of the air-oil separation system, an impeller rotatably coupled with the air-separation shaft and configured to drive rotation of the air-separation shaft and the oil-separation rotor about the axis, wherein the oil-separation rotor includes an inner band arranged circumferentially about the axis, an outer band arranged circumferentially about the inner band, and a metallic foam material located radially between the inner band and the outer band, and wherein the oil-separation rotor further includes a spiral guide rail coupled to the inner band to locate the inner band radially between the spiral guide rail and the metallic foam material.

2. The air-oil separation system of claim 1, further comprising a conduit fluidly coupled with the air outlet and configured to direct air received by the air outlet from the air-separation shaft toward the impeller.

3. The air-oil separation system of claim 1, wherein the air-separation shaft includes a cylindrical body and a metallic foam material located radially within the body in the air passage.

4. The air-oil separation system of claim 1, wherein the drive includes a bladed rotor rotatably coupled with the separation unit.

5. The air-oil separation system of claim 1, wherein the inlet is formed to receive the mixture of air and oil collected in an engine sump and guide the mixture of air and oil into the interior region, and wherein the mixture of air and oil flows from the engine sump to a pump configured to direct the mixture of air and oil into the air-oil separation system through the inlet.

6. An air-oil separation system for a gas turbine engine, the air-oil separation system comprising a housing formed to define an interior chamber and including a first end wall, a second end wall, and a divider plate arranged between the first end wall and the second end wall, the divider plate cooperating with the second end wall to form a drive chamber there between, the housing formed to include an inlet in fluid communication with the interior chamber, an oil outlet in fluid communication with the interior chamber, and an air outlet in fluid communication with the interior chamber, a separation unit including an air-separation shaft and an oil-separation rotor located in the interior chamber and extending between the first end wall and the second end wall, the separation unit configured to receive a mixture of air and oil from the inlet and to rotate about the axis to separate the air from the oil and direct the air toward the air outlet and to direct the oil toward the oil outlet, a rotation drive positioned within the drive chamber, rotatably coupled with the separation unit, and configured to rotate the separation unit about the axis during use of the air-oil separation system, wherein the oil-separation rotor includes first band arranged circumferentially about the axis and the first band is formed to include a plurality of holes that extend radially through the first band, and wherein the oil-separation rotor further includes a spiral guide rail coupled to the first band and extends radially inwardly away from the first band and toward the axis.

7. The air-oil separation system of claim 6, wherein the air-separation shaft is configured to rotate about the axis and the oil-separation rotor is coupled with the air-separation shaft for rotation therewith.

8. The air-oil separation system of claim 6, wherein the air-separation shaft is formed to include an air passage that extends axially through the air-separation shaft and a plurality of air holes that extend radially through the air-separation shaft and open into the air passage and the air passage is in fluid communication with the air outlet.

9. The air-oil separation system of claim 6, wherein the oil-separation rotor includes a second band arranged circumferentially about the first band and a metallic foam material located radially between the first band and the second band.

10. The air-oil separation system of claim 6, wherein the drive includes a bladed rotor rotatably coupled with the separation unit.

11. The air-oil separation system of claim 10, further comprising a conduit fluidly coupled with the air outlet and configured to direct air received by the air outlet from the separation unit toward the bladed rotor.

12. The air-oil separation system of claim 6, wherein the drive includes an electric motor.

13. The air-oil separation system of claim 10, wherein the rotation drive further includes a pressurized fluid source configured to supply pressurized fluid to the bladed rotor.

14. The air-oil separation system of claim 6, wherein the first band is located radially between the spiral guide rail and the metallic foam material.

15. A method comprising providing a housing coupled with a gearbox external to an engine sump of a gas turbine engine, the housing formed to define an interior region therein, providing a separation unit including an air-separation shaft and an oil-separation rotor and located in the interior region of the housing, rotating the separation unit about an axis relative to the housing, guiding a mixture of air and oil collected in the engine sump through an inlet formed to receive the mixture of air and oil and into the interior region of the housing, the mixture of air and oil flowing from the engine sump to a pump configured to direct the mixture of air and oil into the separation unit through the inlet to cause the mixture of air and oil to interact with the rotating separation unit to separate the air from the oil, wherein an impeller rotatably is coupled with the air-separation shaft and configured to drive rotation of the air-separation shaft and the oil-separation rotor about the axis, wherein the oil-separation rotor includes an inner band arranged circumferentially about the axis, an outer band arranged circumferentially about the inner band, and a metallic foam material located radially between the inner band and the outer band, and wherein the oil-separation rotor further includes a spiral guide rail coupled to the inner band to locate the inner band radially between the spiral guide rail and the metallic foam material.

16. The method of claim 15, wherein the separation unit includes an air-separation shaft configured to rotate about the axis and an oil-separation rotor coupled with the air-separation shaft for rotation therewith, the air-separation shaft is formed to include an air passage that extends axially through the air-separation shaft and a plurality of air holes that extend radially through the air-separation shaft and open into the air passage, the oil-separation rotor includes a band arranged circumferentially about the axis, and the band is formed to include a plurality of holes that extend radially through the band.

17. The method of claim 15, wherein the housing includes a first end wall, a second end wall, and a divider plate arranged between the first end wall and the second end wall, the divider plate cooperating with the second end wall to form a drive chamber therebetween, and wherein an impeller is arranged within the drive chamber, the impeller rotatably coupled with the separation unit and configured to drive rotation of the separation unit about the axis.

* * * * *